Aug. 8, 1944.  F. S. SHIELDS  2,355,246
LOCKING DEVICE FOR TURRETS
Filed Aug. 23, 1940  3 Sheets-Sheet 1

INVENTOR.
FRANK S. SHIELDS,
BY
ATTORNEY.

Aug. 8, 1944.  F. S. SHIELDS  2,355,246
LOCKING DEVICE FOR TURRETS
Filed Aug. 23, 1940  3 Sheets-Sheet 2
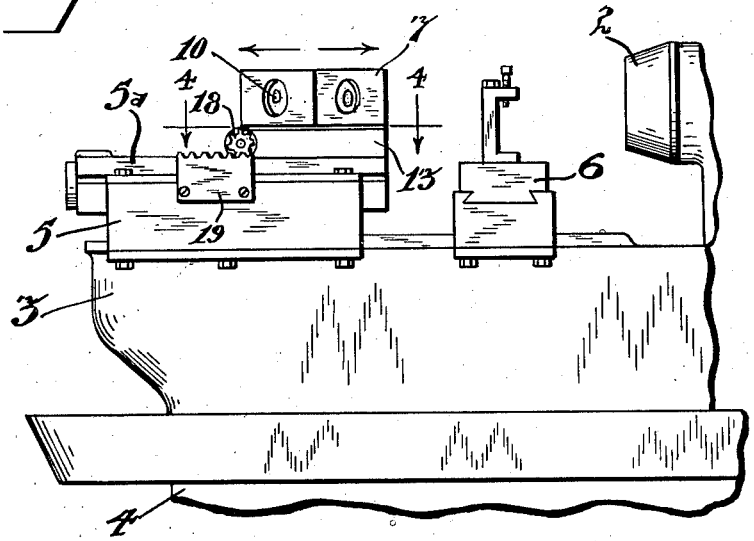
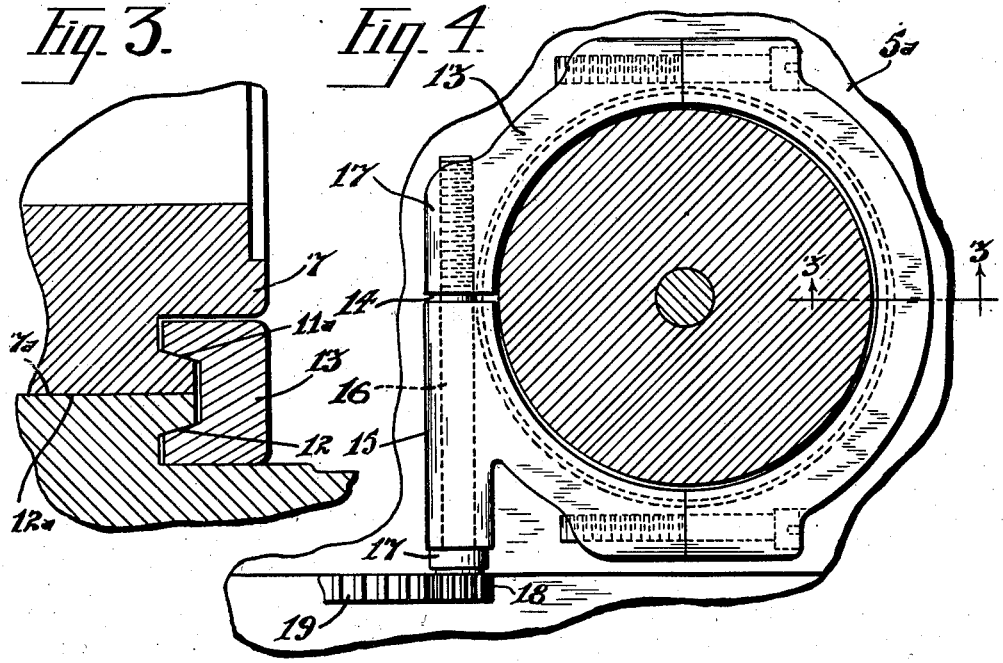
INVENTOR
FRANK S. SHIELDS,
BY
ATTORNEY

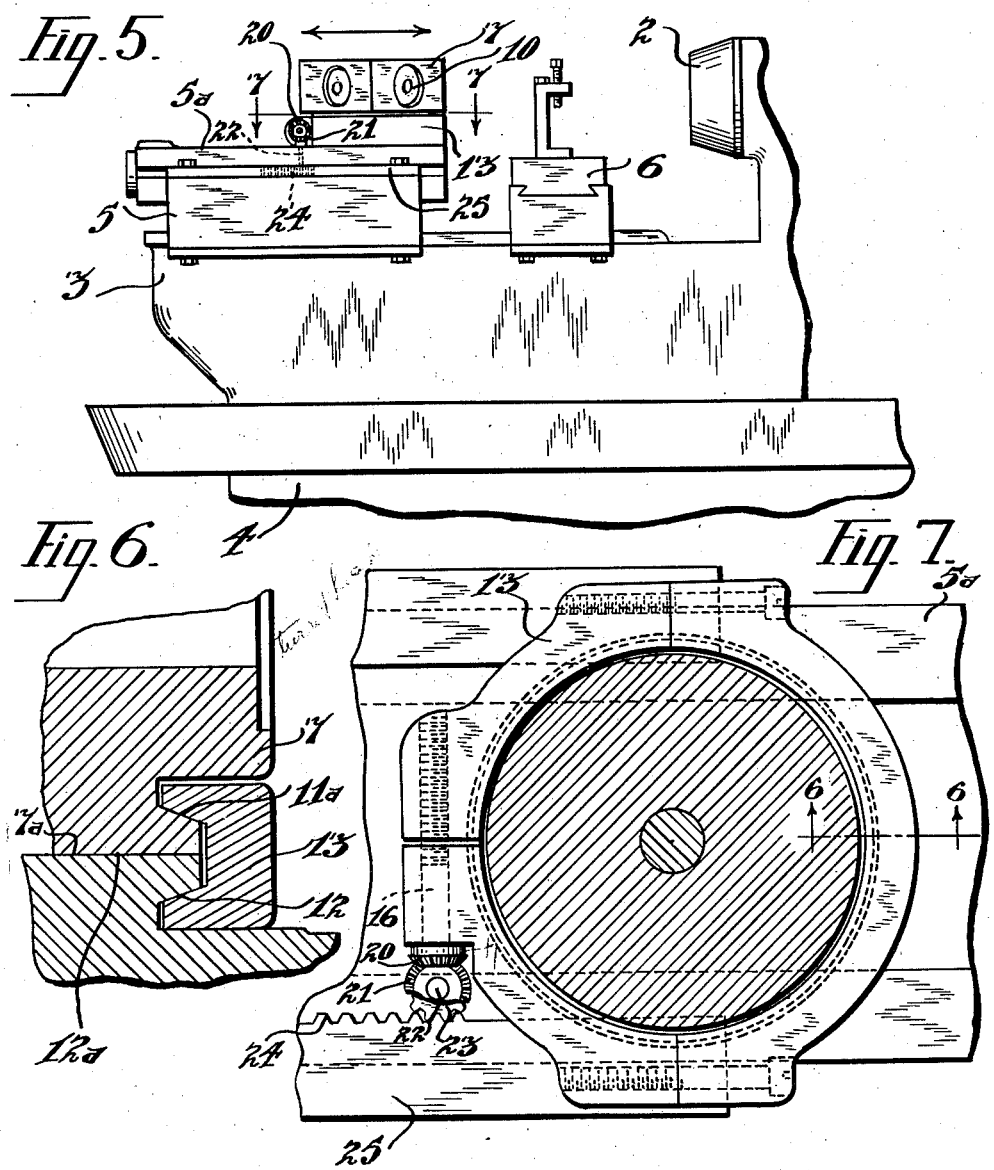

Patented Aug. 8, 1944

2,355,246

UNITED STATES PATENT OFFICE 2,355,246

LOCKING DEVICE FOR TURRETS

Frank S. Shields, Jamaica, N. Y., assignor to Morey Machinery Co., Inc., New York, N. Y., a corporation of New York Application August 23, 1940, Serial No. 353,804

4 Claims. (Cl. 29—49)

This invention relates to a turret clamping device for use on turret lathes, screw machines, or any other type of machine wherein a turret for holding the cutting tools is used.

The usual practice at the present time is to clamp the turret by the use of a nut and bolt, the bolt being placed at the center axis of the turret, and the nut taking the form of a hand lever. The turret itself is indexed by a number of mechanisms which are more or less standard, but must be free at the time of indexing so that the indexing mechanism mounted in the turret frame can freely rotate the turret itself. This loose condition obviously would not be satisfactory when the tools are moving against the work rotated in the spindle of the machine, because the tools would then not produce a uniform cut on the product. Therefore, the turret must be clamped or locked by an extra movement through the nut and bolt as mentioned. This operation requires the machine operator to remove his hand from the feed lever in order to take hold of the locking nut lever, and as this interval of locking and unlocking the turret oftentimes exceeds the cutting time, there is a considerable loss of motion on the part of the operator in handling the machine.

It is the purpose of this invention to provide an automatic means for clamping the turret on the forward motion when the tools move to do the work, and to unclamp on the reverse motion in time for the clamping to be released, thereby permitting the turret mechanism to index the turret.

The invention further contemplates the easy adjustment of the amount of clamping provided, which adjustment likewise permits of adjustment for wear as the machine becomes older.

The principles of the invention are likewise equally as applicable to those machine tools in which the turret carries the work instead of the tools.

The invention will be more clearly understood by reference to the accompanying drawings, in which:

Figure 2 is a fragmental rear view of the same machine shown in Figure 1.

Figure 3 is a section taken on the line 3—3 of Figure 4.

Figure 4 is a section taken on the line 4—4 in Figure 2.

Figure 5 is a fragmental rear view of a turret lathe similar to Figure 2, but showing an alternate construction of the locking device.

Figure 6 is a section taken on the line 6—6 in Figure 7.

Figure 7 is a section taken on the line 7—7 in Figure 5.

Similar reference numerals refer to similar parts throughout the drawings.

Figure 1:
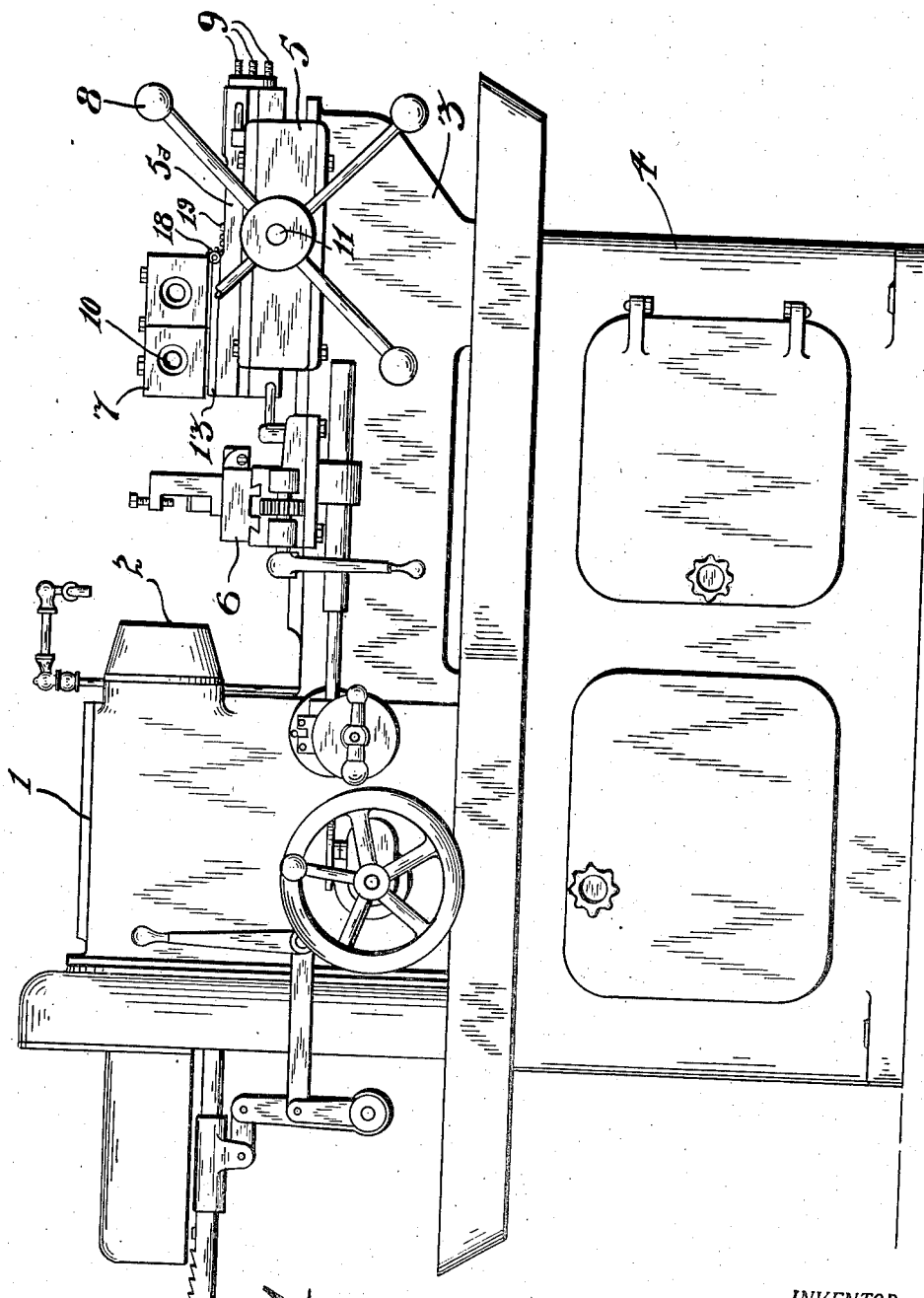
Figure 1 is a front elevation of a turret lathe or screw machine to which the device has been applied.

In the drawings, 1 is a turret lathe, consisting essentially of a spindle 2, a bed 3, stand 4, turret 5, and cross slide 6. The turret member 5 is adapted to be clamped firmly to the bed 3, and has the usual rotating hexagon head 7, hand lever 8, and stops 9. The work on this type of machine is usually passed through the hole in the spindle 2 and is clamped therein by a split chuck or collet with standard closing mechanism. As the work usually consists of a bar of metal, this protrudes from the end of the spindle 2 and toward the turret head 7. The turret head 7 has a series of holes 10 which clamp suitable tools for cutting the metal; these may be box tools, hollow mills, boring bars, threading dies, and the like. In accordance with the part to be produced on the machine, the tools are set up on the turret head in sequence, so that each of the tools mounted therein performs a specific operation in a preferred order. In order to move the tools to and from the work, a hand wheel or lever 8 is used, and is generally attached to a shaft 11 which extends into the turret 5 and carries a pinion which engages a rack (not shown). The rotation of the wheel 8 causes the slide part of the turret, 5A, to move in the guides of the fixed part 5. It will thus be seen that the counter-clockwise rotation of the wheel 8 causes the slide 5A to move toward the spindle, and a clock-wise rotation would carry the turret away from the spindle. The extent of movement of the turret slide 5A toward the spindle is controlled by a number of stop screws 9 set in the rear of the slide 5A. The turret head 7 is mounted to rotate on the turret slide member 5A with an indexing action, so that it always has one of the tool mounting holes 10 in line with the spindle. The turret head 7 remains stationary when the slide 5A moves toward the spindle, and indexes one position when the turret slide 5A moves away from the spindle.

It is desired to clamp the turret head 7 on its movement toward the spindle, and while the cutting tool is engaging the work, and to unclamp it when it is retracting away from the spindle so as to permit the automatic turret indexing mechanism, which is of a standard design contained within the turret members 5 and 5A, to index the turret. For this purpose of clamping the turret head, applicant has provided an annular flange 11a at the base of the turret head, and a corresponding annular flange 12 on top of the turret slide 5A. These flanges are preferably of the same size and are tapered as shown in Figure 3. The turret head 7 has a base 7A that rests directly upon the upper surface 12A of the flange 12, and in order to clamp the two elements together, a clamping ring 13 is machined to fit the tapered flanges 11 and 12. The clamp ring 13 completely encircles the flanges 11 and 12, but is split at 14 in order to permit the clamping movement. A boss 15 is formed integrally with one side of the clamping ring, and is adapted to receive a shaft 16 which extends therethrough and is threaded into a boss 17 formed on the other end of the clamping ring 13. This shaft 16 acts as a bolt to draw together the clamping ring 13 to clamp the turret head, or to expand it to release the turret head. The shaft 16 has a collar 17 which may be equipped with a ball bearing (not shown) which acts as a head for the bolt. Mounted outside of the head 17 but on the shaft 16, is a pinion 18 adapted to engage a rack 19 which is fastened onto the turret frame 5.

Referring to Figure 2, the turret head 7 is moved toward and from the spindle, as indicated by the arrows, being carried by the slide 5A. The clamping ring 13 with the clamping bolt 16 and pinion 18 is mounted directly below the turret head 7, and is likewise carried to and fro with the slide 5A. The rack 19 is fastened rigidly to the turret 5, which in turn is clamped rigidly to the frame 3 and is therefore a stationary member. It will thus be seen that a movement of the turret head toward the spindle will cause the pinion 18, which engages rack 19, to rotate and thereby tighten the screws formed on the end of the shaft 16 which contracts the clamping ring 13. Upon reversing the movement of the turret slide 5A, the pinion 18 is reversed in direction and releases the clamping ring 13.

Should the movement of the slide 5A and turret head 7 carry the pinion 18 off the end of the rack 19 when advancing toward the spindle, the pinion 18 will remain in identically the same position as when it left the end of the rack, and upon returning to engagement with the rack, the teeth will be exactly in mesh and pick up for the releasing action, exactly where they left off. Should it be desired to tighten or loosen the clamping action of the ring 13, it is only necessary to move the pinion one tooth in either direction whichever may be desired, and the adjustment has been made.

An alternate form of construction of the locking device is shown in Figures 5, 6, and 7, in which the locking bolt 16 is equipped with a mitre gear 20 which engages a similar mitre gear 21. The mitre gear 21 is mounted on a shaft 22 which extends vertically through the turret slide 5A. A pinion 23 is attached to the lower extremity of the shaft 22 which engages a rack 24 formed on the turret slide gib 25.

It is obvious that the purpose of this arrangement is to house the parts within the machine so that they will not be subject to dirt or exposed to cause injuries. The operation of this alternate form is exactly as previously described in connection with Figures 1, 2, 3, and 4.

Having described the invention, what is claimed as new and is desired to be secured by Letters Patent is:

1. In a machine tool, in combination, a bed, a turret mounted thereon, said turret comprising a reciprocable member and an indexing head, clamping means between the reciprocable member and the indexing head adapted to simultaneously engage portions of the slide and head, means to actuate said clamping means comprising a pinion operatively connected with the clamping means to actuate the same, and a fixed rack to engage and rotate the pinion, said rack being of predetermined length whereby said pinion may be carried off the rack for adjustment of the clamping action.

2. In a turret for a machine tool, a frame, a slide adapted to move in the frame, a turret head mounted on the slide and adapted to be indexed thereon, a split clamping ring adapted to simultaneously engage the slide and turret head, a bolt engaging the clamping ring, a pinion mounted on the bolt, a rack mounted on the said frame and adapted to engage the pinion and to rotate the bolt to open or close the clamping ring, the action dependent upon the movement of the slide with respect to the frame.

3. In a machine tool, a bed, a spindle and turret mounted thereon, the turret consisting of a stationary member, a slide member, and an indexing head; a split clamping ring interposed between the indexing head and the slide of the turret and adapted to simultaneously engage a portion of the slide and a portion of the turret head, a bolt engaging the clamping ring, a pinion mounted on the bolt, a rack mounted on the said stationary member and adapted to engage the pinion and to rotate the bolt to open or close the clamping ring, the action depending upon the movement of the slide with respect to the stationary member.

4. In a turret for a machine tool, a frame, a slide, means to support the slide for movement with respect to the frame, a turret head mounted on the slide and adapted to be indexed thereon, clamping means adapted to simultaneously engage the slide and turret head, a bolt engaging the clamping means to actuate the same, a shaft carried by the slide, gearing between the bolt and the shaft, a second gear means carried by the shaft and a rack fixed with respect to the frame and engageable by the second gear means to actuate the bolt and thereby the clamping means upon movement of the slide with respect to the frame.

FRANK S. SHIELDS.